Patented Dec. 30, 1947

2,433,500

UNITED STATES PATENT OFFICE 2,433,500

ALPHA-CYCLOPROPYL ACRYLONITRILE

Thomas F. Wood, Clifton, N. J., assignor to United States Rubber Company, New York, N. Y., a corporation of New Jersey No Drawing. Application April 9, 1946, Serial No. 660,863

1 Claim. (Cl. 260—464)

This invention relates to a new composition of matter which is referred to as alpha-cyclopropyl acrylonitrile.

The new compound is a liquid of the following properties: $N_D^{20}=1.4553$; $d_4^{20}=0.892$; B. Pt.=47–48° C. at 25 mm.; $M_d$ ref.=28.30 ($M_d$ ref. calc.=28.03). The compound tends to discolor on standing, becoming yellow. When freshly distilled, it is colorless. % N=14.93 (calc.=15.06).

A method of preparing this compound involves the following steps: (1) reaction of commercial methyl cyclopropyl ketone with liquid HCN in the presence of a basic catalyst to produce the cyanohydrin, alpha-methyl-alpha-cyclopropyl glycolonitrile; (2) acetylation of the cyanohydrin with acetic anhydride and sulfuric acid catalyst to produce alpha-acetoxy-alpha-cyclopropyl propionitrile; and (3) pyrolysis of this acetate at a temperature of 430–450° C. to eliminate acetic acid and produce the desired alpha-cyclopropyl acrylonitrile. The acetic acid may be removed by distillation or by washing with soda solution. The product is then vacuum distilled to purify it and is obtained as a water-white liquid of rather acrid odor which somewhat resembles nitrobenzol in smell.

The reactions may be represented as follows:

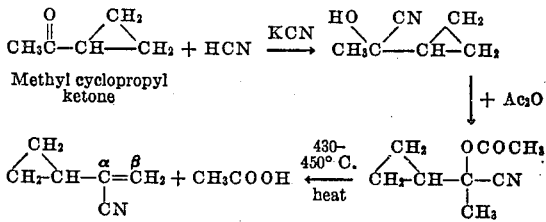

The following examples illustrate, in detail, a method of carrying out the synthesis:

EXAMPLE

(a) Methyl cyclopropyl ketone cyanohydrin

Into a suitable flask provided with a stirrer, reflux condenser and feed funnel are charged 700 cc. of liquid HCN and 12 gms. of KCN. The mixture is well cooled externally with ice and water and stirred while there were fed in 1265 cc. of methyl cyclopropyl ketone over a 15–20 minute period. The mixture is stirred for 2 hours with ice-cooling, and then packed in dry-ice and allowed to stand without stirring overnight. On the following morning the cold mixture is stirred and acidified with 22 cc. of 50% sulfuric acid. The liquid product (yellowish brown in color) is filtered and vacuum distilled. There are obtained 215 gms. of recovered ketone and 1132 gms. of the pure cyanohydrin boiling at 80–85° C. at 5 to 7 mm. Based on the ketone consumed in the reaction the yield is 93% of theory. The cyanohydrin has the following physical constants: B. Pt.=70° C./5 mm.; $n_D^{20}=1.4410$; $d_4^{20}=0.9962$; $M_d$ ref. = 29.42 (calc.=29.69).

(b) Alpha-acetoxy-alpha-cyclopropyl propionitrile

Into a suitable flask provided with a thermometer, stirrer, feed funnel and reflux condenser are placed 370 gms. of 95% acetic anhydride (10% excess over theory); to this is added 1 cc. of 95% sulfuric acid. The mixture is heated to 80° C. with stirring. Into the anhydride are run 345 gms. (3.1 moles) of the cyanohydrin of methyl cyclopropyl ketone with stirring during a period of about 20 minutes. The temperature rises to 100° C. during the course of the acetylation. After all of the cyanohydrin has been added, the mixture is held at 95° C. for 2 hours. After cooling, the mixture is vacuum distilled directly. There is obtained a forerun amounting to about 200 gms. of acetic acid and then 409 gms. of alpha-acetoxy-alpha-cyclopropyl propionitrile (85.5% of theory). The product is a water-white liquid, B. Pt.=80° C. at 6.5 mm.; $n_D^{20}=1.4389$; $d_4^{20}=1.025$; $M_D$ ref.=39.20 (calc.=39.11).

(c) Alpha-cyclopropyl acrylonitrile

A suitably provisioned vertical pyrolysis Pyrex tube is provided with an inlet for feeding therein nitrogen gas, and is also connected to a receiver flask which is adapted to be cooled with ice water. The receiver is provided with a dry-ice trap, which in turn is further connected to an absorbing tower packed with activated charcoal and KOH pellets, in order to absorb any HCN which might pass through the dry-ice trap.

The pyrolysis tube is heated, by suitable means, to 440° C. and after thorough flushing with nitrogen, 300 gms. of alpha-acetoxy-alpha-cyclopropyl propionitrile are dropped into the tube through a feed funnel at a rate of about 4–5 cc. per minute with a small stream of the nitrogen gas flowing through the apparatus. About 1¼ hours are required for the feeding and the temperature is maintained between 430–440° C. during this time. At the end of the pyrolysis the receiver contains 295 gms. of liquid. There is added 0.3 gm. of sulfur to inhibit polymerization, and the liquid is allowed to stand overnight in a cooled Dewar flask. On the following day the distillate is fractionally vacuum distilled. There are obtained (1) 103 gms. of acetic acid, (2) 38 gms. of intermediate boiling material, and (3) 102 gms. of liquid product boiling at 35° C. at 12 mm. of index of refraction 1.4532 to 1.4550. When fraction (3) is washed with dilute bicarbonate solution until neutral to litmus and redistilled, it is found to have a constant boiling point at 51.5° C. at 29 mm., and the refractive index remains constant at 1.4553 during the distillation. About 100 gms. of the purified product are obtained from the run.

An alternative method of procedure consists of washing and crude liquid condensate from the pyrolysis with water and finally with dilute sodium carbonate solution to remove all of the acetic acid prior to distillation. In this way a somewhat purer product may be obtained with only one distillation. The yield of product obtained in this manner usually amounts to about 77% of theory based on the acetate converted. Under the operating conditions above described there is obtained about 90% conversion in the pyrolysis step.

The product is colorless when first distilled but soon becomes yellow on standing. The compound shows little tendency to polymerize when heated with benzoyl peroxide at 62° C. for a long period of time.

Alpha-cyclopropyl acrylonitrile is the first member of a new homologous series, namely, the alpha-alicyclic acrylonitriles and may be used as starting point for the preparation of alpha-cyclopropyl acrylic acid and its derivatives (i. e., esters, amides, etc.). It may furthermore be used in syntheses of the Michael addition type using basic catalysts; for example, addition of phthalimide in the presence of a strong base followed by hydrolysis would result in the formation of beta-amino-alpha-cyclopropyl propionic acid, a new amino acid.

While I have shown and described various embodiments of the invention, it is to be understood that the invention is susceptible to those modifications which appear within the spirit of the invention and the scope of the appended claim.

Having thus described my invention, what I claim and desire to protect by Letters Patent is:

Alpha-cyclopropyl acrylonitrile.

THOMAS F. WOOD.

REFERENCES CITED

The following references are of record in the file of this patent:

UNITED STATES PATENTS

| Number | Name | Date |
|---|---|---|
| 2,375,015 | Marple et al. | May 1, 1945 |
| 2,394,520 | Lichty | Feb. 5, 1946 |

FOREIGN PATENTS

| Number | Country | Date |
|---|---|---|
| 116,654 | Australia | Mar. 11, 1943 |